United States Patent
Hasegawa

(10) Patent No.: US 9,982,750 B2
(45) Date of Patent: May 29, 2018

(54) SILENT CHAIN

(71) Applicant: TSUBAKIMOTO CHAIN CO., Osaka-shi, Osaka (JP)

(72) Inventor: Motonobu Hasegawa, Osaka (JP)

(73) Assignee: TSUBAKIMOTO CHAIN CO., Osaka-shi (JP)

(*) Notice: Subject to any disclaimer, the term of this patent is extended or adjusted under 35 U.S.C. 154(b) by 386 days.

(21) Appl. No.: 14/936,740

(22) Filed: Nov. 10, 2015

(65) Prior Publication Data
US 2016/0138676 A1    May 19, 2016

(30) Foreign Application Priority Data
Nov. 14, 2014    (JP) .................. 2014-231793

(51) Int. Cl.
*F16G 13/04*    (2006.01)
*F16G 13/08*    (2006.01)

(52) U.S. Cl.
CPC .......... *F16G 13/04* (2013.01); *F16G 13/08* (2013.01)

(58) Field of Classification Search
CPC ....................................... F16G 13/04
USPC ................................ 474/213, 214
See application file for complete search history.

(56) References Cited

U.S. PATENT DOCUMENTS

| 6,045,473 A | 4/2000 | Matsumoto et al. |
| 7,204,775 B2* | 4/2007 | Teubert ............ F16G 5/18 474/206 |
| 2001/0006918 A1 | 7/2001 | Saitou |
| 2002/0123404 A1* | 9/2002 | Okabe ............ F16G 13/04 474/212 |

(Continued)

FOREIGN PATENT DOCUMENTS

| CN | 100529462 C | 8/2009 |
| JP | 10-238597 A | 9/1998 |
| JP | 2001-182780 A | 7/2001 |

OTHER PUBLICATIONS

Office Action dated Dec. 19, 2018, issued in counterpart Korean Application No. 10-2015-0155131, with English translation (13 pages).

*Primary Examiner* — William E Dondero
*Assistant Examiner* — Mark K Buse
(74) *Attorney, Agent, or Firm* — Westerman, Hattori, Daniels & Adrian, LLP

(57) ABSTRACT

An object is to provide a silent chain that enhances the degree of design freedom for component dimensions to improve a chain strength with respect to a chain tensile force and that suppresses chain wear elongation. A silent chain includes a plurality of link plates arranged in a chain longitudinal direction and a chain width direction and coupled together by coupling pins so as to be bendable. The silent chain includes a plurality of plate longitudinal-direction trains each having the link plates arranged in the chain longitudinal direction. At least one of the plate longitudinal- (Continued)

direction trains includes a plurality of protruding-portion-installed plates having protruding portions protruding in the chain width direction from one side surface of a plate portion. The protruding-portion-installed plates 20 are arranged adjacently to one another in the chain longitudinal direction, with the protruding portions being different from one another in orientation in the chain width direction.

5 Claims, 4 Drawing Sheets

(56) References Cited

U.S. PATENT DOCUMENTS

| | | | |
|---|---|---|---|
| 2002/0160871 A1* | 10/2002 | Okabe | F16G 13/04 474/212 |
| 2003/0236145 A1* | 12/2003 | Ledvina | F16G 5/18 474/215 |
| 2005/0049098 A1* | 3/2005 | Butterfield | F16G 13/04 474/212 |
| 2008/0070732 A1* | 3/2008 | Ledvina | F16G 13/04 474/206 |
| 2008/0132368 A1* | 6/2008 | Wu | F16G 13/04 474/213 |
| 2008/0227575 A1* | 9/2008 | Fujiwara | F16G 13/02 474/212 |
| 2010/0004083 A1* | 1/2010 | Bongard | F16G 13/04 474/212 |
| 2010/0016110 A1* | 1/2010 | Yoshida | F16G 13/04 474/213 |
| 2010/0120568 A1* | 5/2010 | Ogo | F16G 13/04 474/230 |
| 2011/0009221 A1* | 1/2011 | Ogo | F01L 1/02 474/213 |
| 2012/0035012 A1* | 2/2012 | Yoshimura | F16G 13/04 474/213 |
| 2012/0100946 A1* | 4/2012 | Kotera | F16G 13/04 474/206 |

* cited by examiner

Related Art

SILENT CHAIN

BACKGROUND OF THE INVENTION

1. Field of the Invention

The present invention relates to a silent chain including a plurality of link plates arranged in a chain longitudinal direction and a chain width direction and coupled together by coupling pins so as to be bendable.

2. Description of the Related Art

A silent chain is conventionally known in which guide trains each including a lateral pair of guide plates and a middle plate and non-guide-trains each including a plurality of inner plates are alternately coupled together in a chain longitudinal direction by coupling pins, the lateral pair of guide plates each having a longitudinal pair of pin holes, the middle plate being arranged between the guide plates and having a longitudinal pair of pin holes, the inner plates each having a longitudinal pair of pin holes, the coupling pins being inserted into the pin holes (see, for example, Japanese Patent Application Laid-open No. H10-238597).

For such a silent chain, in order to improve the strength of each link plate 120, portions A and B around each pin hole in the link plate 120 as depicted in FIG. 8 can be designed to have large dimensions by adjusting the sizes of peripheral members such as sprockets and chain guides.

However, as depicted in FIG. 8, a portion C positioned in front or back of the pin hole is limited in dimensional design in order to avoid interference between the link plates 120 adjacent to each other in the chain longitudinal direction. In order to improve the strength of the link plate 120 with respect to a chain tensional force, another measure needs to be taken, for example, each link plate 120 needs to be designed to have a large plate thickness. Furthermore, since the portion C positioned in front or back of the pin hole is limited in dimensional design as described above, the dimensional design of the diameters of the pin hole in each link plate 120 and the coupling pin is disadvantageously limited.

Thus, the present invention is intended to solve these problems. An object of the present invention is to provide a silent chain that enhances the degree of design freedom for component dimensions to improve the chain strength with respect to the chain tensile force and that suppresses chain wear elongation.

SUMMARY OF THE INVENTION

The present invention solves the above-described problems by providing a silent chain including a plurality of link plates arranged in a chain longitudinal direction and a chain width direction and coupled together by coupling pins so as to be bendable, the silent chain including: a plurality of plate longitudinal-direction trains each having the link plates arranged in the chain longitudinal direction, wherein at least one of the plate longitudinal-direction trains includes a plurality of protruding-portion-installed plates having protruding portions protruding in the chain width direction from one side surface of a plate portion, and the plurality of protruding-portion-installed plates are arranged adjacently to one another in the chain longitudinal direction, with the protruding portions being different from one another in orientation in the chain width direction.

In one aspect of the present invention, at least one of the plurality of plate longitudinal-direction trains includes a plurality of protruding-portion-installed plate having protruding portions protruding in the chain width direction from one side surface of a plate portion, and the plurality of protruding-portion-installed plates are arranged adjacently to one another in the chain longitudinal direction, with the protruding portions being different from one another in orientation in the chain width direction. This enables design of the plate portions such that the plate portions have a large dimension in the chain longitudinal direction, while allowing avoidance of interference between the protruding-portion-installed plates arranged adjacently to one another in the chain longitudinal direction. Consequently, the chain strength with respect to the chain tensile force can be improved.

Designing the plate portions such that the plate portions have a large dimension in the chain longitudinal direction enables the pin hole in the plate portion and the coupling pin to be designed to have large diameters. This allows reduction of the surface pressure between the pin hole in the plate portion and the coupling pin, enabling suppression of chain wear elongation and improvement of the strength of the coupling pin.

In another aspect of the present invention, the protruding portions of the protruding-portion-installed plate are each a cylindrical protruding portion protruding in the chain width direction from an edge of the pin hole in the plate portion. Thus, the cylindrical protruding portions are utilized as bearing portions for the coupling pins to enable a further reduction in the surface pressure between the protruding-portion-installed plate and the coupling pin, allowing further suppression of chain wear elongation.

In another aspect of the present invention, the pin hole and the protruding portion of the protruding-portion-installed plate are formed by burring. Thus, the protruding-portion-installed plate can be easily provided with the cylindrical protruding portions without increasing manufacturing burdens.

In another aspect of the present invention, a protrusion dimension of the protruding portion in the chain width direction is set equal to or larger than a thickness of the plate portion in the chain width direction. Thus, the position of the plate portion in the chain width direction can be adjusted using the protruding portion, allowing reliable prevention of interference between the protruding-portion-installed plates adjacent to each other in the chain longitudinal direction.

In another aspect of the present invention, the plate portion is sized to allow the plate portions of the protruding-portion-installed plates adjacent to one another in the chain longitudinal direction to overlap as viewed in the chain width direction. Thus, the chain strength with respect to the chain tensile force can be improved.

DESCRIPTION OF THE PREFERRED EMBODIMENTS

Figure 1:
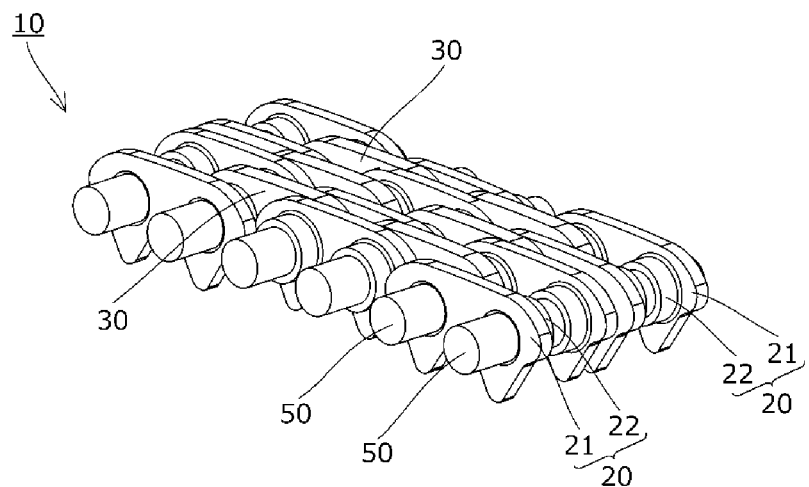
FIG. 1 is a perspective view depicting a silent chain of a first embodiment.

A silent chain 10 of the present invention will be described below based on FIGS. 1 to 7.

The silent chain 10 is configured as a timing chain assembled in a timing system for an automobile engine. As depicted in FIGS. 1 to 7, the silent chain 10 includes link plates 20, 30, and 40 arranged in juxtaposition in a chain longitudinal direction and a chain width direction and coupled together by coupling pins 50 so as to be bendable.

First, configurations of components of the silent chain 10 will be described.

The silent chain 10 includes, as the link plates 20, 30, and 40, protruding-portion-installed plates 20, flat plates 30, and guide plates 40.

Figure 2:
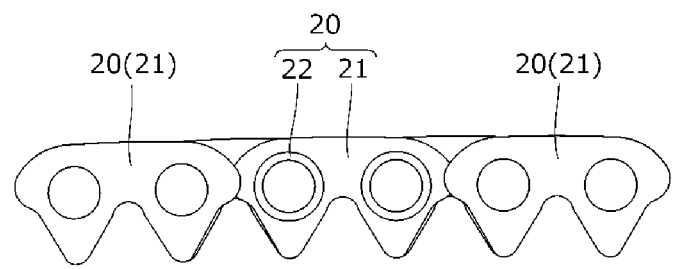
FIG. 2 is a diagram illustrating the silent chain of the first embodiment.
Figure 3:
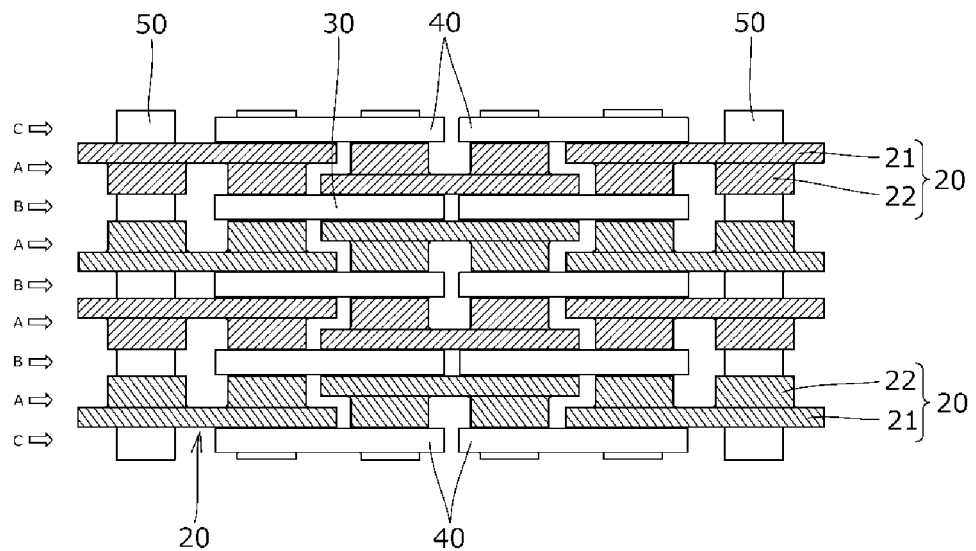
FIG. 3 is a side view depicting the silent chain of the first embodiment.

As depicted in FIGS. 1 to 3, each of the protruding-portion-installed plates 20 integrally has a plate portion 21 and protruding portions 22 protruding in the chain width direction from one side surface of the plate portion 21.

As depicted in FIGS. 1 and 2, the plate portion 21 has a longitudinal pair of pinholes formed in juxtaposition in the chain longitudinal direction and a pair of V-shaped link teeth that mesh with sprockets (not depicted in the drawings) formed at chain bending inner-peripheral-side edges.

As depicted in FIGS. 1 and 2, each of the protruding portions 22 is formed as a cylindrical protruding portion protruding in the chain width direction from an edge of the pin hole in the plate portion 21.

The pin holes in the plate portion 21 and the cylindrical protruding portions 22 are formed by burring holes drilled in the plate portion 21.

The flat plate 30 has a longitudinal pair of pin holes formed in juxtaposition in the chain longitudinal direction and a pair of V-shaped link teeth that mesh with sprockets (not depicted in the drawings) formed at chain bending inner-peripheral-side edges.

The guide plate 40 has a longitudinal pair of pin holes formed in juxtaposition in the chain longitudinal direction and has no link teeth. In FIGS. 1 and 2, illustration of the guide plates 40 is omitted.

The coupling pins 50 are loosely inserted into the pin holes in the plates arranged inside in the chain width direction (in the present embodiment, the protruding-portion-installed plates 20 or the flat plates 30) and fixedly inserted into the plates arranged at opposite outer sides in the chain width direction (in the present embodiment, the guide plates 40).

Next, plate longitudinal-direction trains A to C will be described each of which includes the link plates 20, 30, or 40 arranged in juxtaposition in the chain longitudinal direction.

As depicted in FIGS. 3 to 7, the silent chain 10 includes the first plate longitudinal-direction trains A each with the protruding-portion-installed plates 20 arranged in juxtaposition in the chain longitudinal direction, the second plate longitudinal-direction trains B each with the flat plates 30 arranged in juxtaposition in the chain longitudinal direction, and the third plate longitudinal-direction trains C each with the guide plates 40 arranged in juxtaposition in the chain longitudinal direction.

The second plate longitudinal-direction trains B each with the flat plates 30 arranged in juxtaposition in the chain longitudinal direction are not essential. The guide plates 40 that guide the silent chain 10 in the chain width direction are also not essential if peripheral members such as sprockets (not depicted in the drawings) have a function to guide the silent chain 10 in the chain width direction.

In the first plate longitudinal-direction train A, the plurality of protruding-portion-installed plates 20 adjacent to one another in the chain longitudinal direction are arranged such that the protruding portions 22 alternate with one another in orientation as depicted in FIGS. 3 to 7.

The protruding-portion-installed plates 20 adjacent to one another in the chain longitudinal direction are also arranged such that the plate portion 21 of the protruding-portion-installed plate 20 lies opposite to the adjacent protruding portions 22 of the protruding-portion-installed plate 20 in the chain longitudinal direction as depicted in FIGS. 3 to 7.

As depicted in FIGS. 3 to 7, the protrusion dimension of the protruding portion 22 in the chain width direction is set equal to or larger than the thickness of the plate portion 21 in the chain width direction. This prevents interference between the plate portions 21 of the protruding-portion-installed plates 20 adjacent to one another in the chain longitudinal direction.

As depicted in FIG. 2 and the like, each of the plate portions 21 is sized to allow the plate portions 21 of the protruding-portion-installed plates 20 adjacent to one another in the chain longitudinal direction to overlap as viewed in the chain width direction.

In the second plate longitudinal-direction train B and the third plate longitudinal-direction train C, a plurality of the flat plates 30 or a plurality of the guide plates 40 are arranged in alignment in the chain longitudinal direction as depicted in FIGS. 3 to 7.

Next, an arrangement pattern of the plate longitudinal-direction trains A to C in the chain width direction will be described based on FIGS. 3 to 7.

First, in the present invention, at least one first plate longitudinal-direction train A may be included as in the examples depicted in FIGS. 3 to 7. The second plate longitudinal-direction trains B may be omitted as in the examples depicted in FIGS. 5 to 7.

Figure 4:
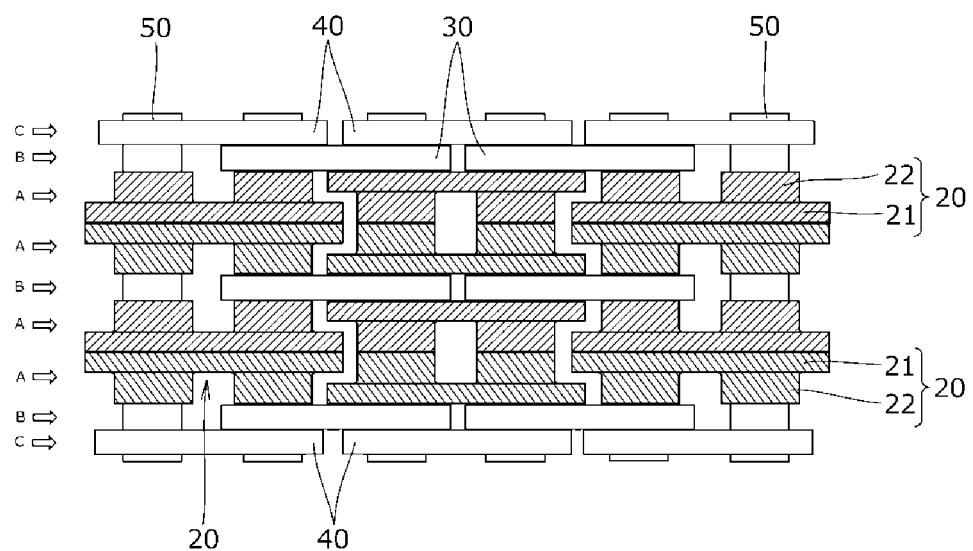
FIG. 4 is a diagram illustrating a silent chain of a second embodiment.
Figure 5:
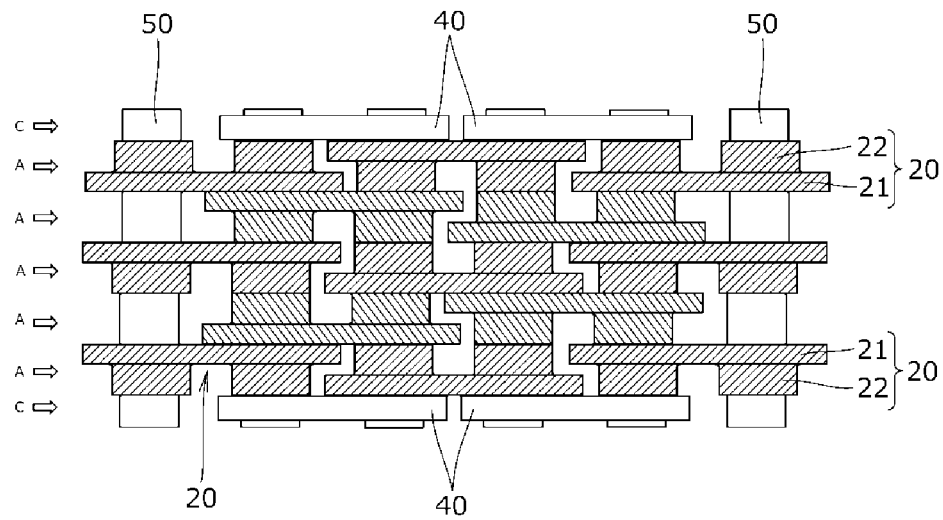
FIG. 5 is a diagram illustrating a silent chain of a third embodiment.
Figure 6:
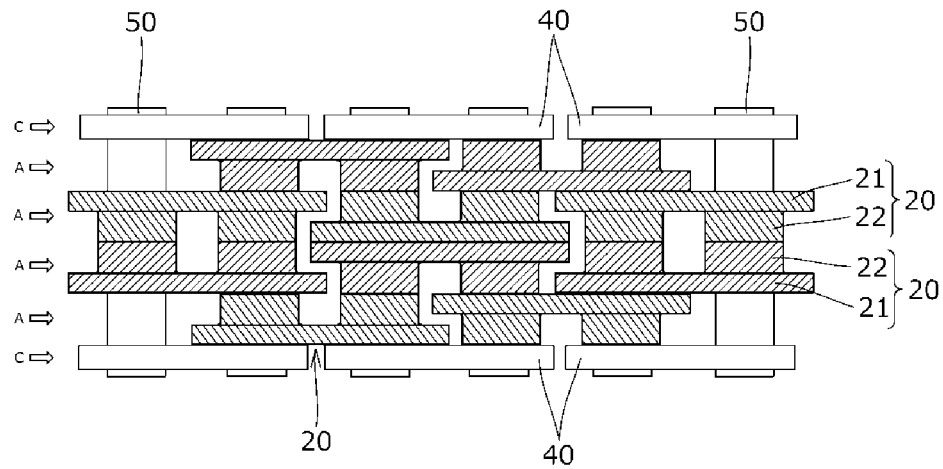
FIG. 6 is a diagram illustrating a silent chain of a fourth embodiment.
Figure 7:
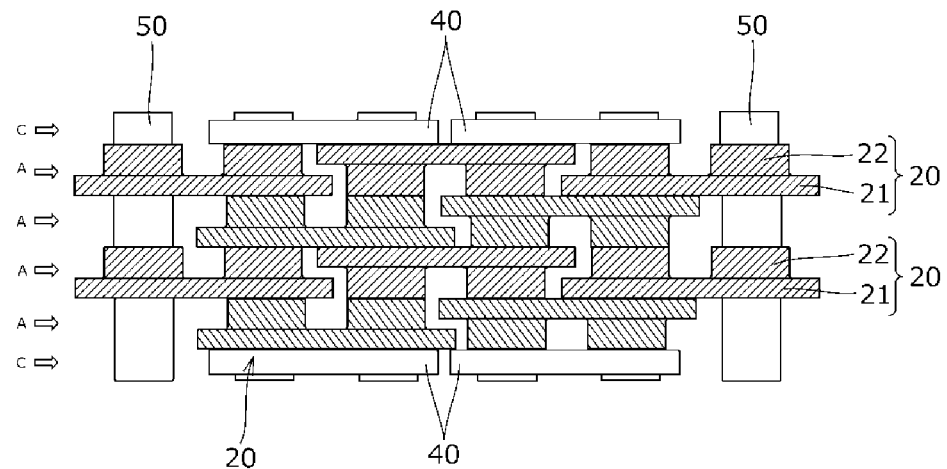
FIG. 7 is a diagram illustrating a silent chain of a fifth embodiment.
Figure 8:
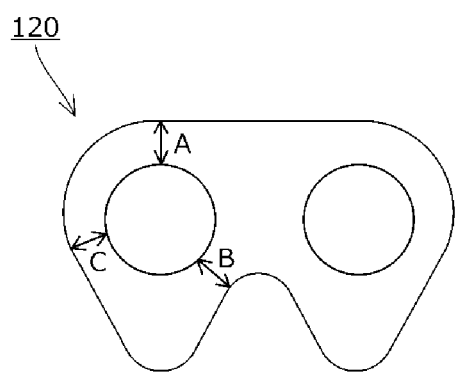
FIG. 8 is a diagram depicting conventional link plates.

The protruding-portion-installed plates 20 may be arranged on guide trains (chain width direction trains) with the guide plates 40 arranged thereon as in the example depicted in FIG. 4, on non-guide-trains (chain width direction trains) with no guide plates 40 arranged thereon as in the example depicted in FIG. 3, or on both guide trains and non-guide-trains as in the examples depicted in FIGS. 5 to 7. The protruding-portion-installed plate 20 has the cylindrical protruding portions 22 also functioning as bearings for the coupling pins 50, hence the protruding-portion-installed plate 20 is preferably arranged on the non-guide-train, which slides with the coupling pins 50.

As in the examples depicted in FIGS. 3, 4, and 6, the plate longitudinal-direction trains A to C are desirably arranged such that the entire silent chain 10 is laterally symmetric in the chain width direction in view of a weight balance in the chain width direction. However, the plate longitudinal-direction trains A to C maybe arranged such that the entire silent chain 10 is asymmetric in the chain width direction as in the examples depicted in FIGS. 5 and 7.

In the examples depicted in FIGS. 3 to 7, the first plate longitudinal-direction train A includes only the protruding-portion-installed plates 20. However, a plate longitudinal-direction train with the protruding-portion-installed plates 20 may include a plate not configured as the protruding-portion-installed plate 20.

When the first plate longitudinal-direction trains Aare arranged adjacently to one another in the chain width direction, the plate portions 21 of the protruding-portion-installed plates 20 may lie opposite to each other in the chain width direction, the protruding portion 22 and the plate portion 21 may lie opposite to each other in the chain width direction, or the protruding portions 22 may lie opposite to each other in the chain width direction.

The embodiments of the present invention have been described in detail. However, the present invention is not limited to the above-described embodiments, and various design changes may be made to the embodiments without departing from the present invention recited in the claims.

For example, in the above description of the embodiments, the silent chain is a timing chain for an automobile engine. However, the application of the chain of the present invention is not limited to this. The silent chain may be any chain such as a transmission chain or a conveying chain.

The silent chain may be configured by optionally combining the configurations of the above-described plurality of embodiments.

Any material such as metal or resin may be used for each component of the silent chain.

In the above description of the embodiments, the protruding portions of the protruding-portion-installed plate are integrally formed on the plate portion. However, the protruding portions may be formed separately from the plate portion.

In the above description of the embodiments, the protruding portions of the protruding-portion-installed plate are each shaped like a cylinder protruding from the edge of the pin hole in the plate portion. However, the protruding portion may have any specific aspect as long as the protruding portion protrudes in the chain width direction from one side surface of the plate portion.

In the above description of the embodiments, the plate portion of the protruding-portion-installed plate is sized such that, when the silent chain is linearly extended, the plate portions of the protruding-portion-installed plates adjacent to one another in the chain longitudinal direction overlap as viewed in the chain width direction. However, the plate portion of the protruding-portion-installed plate may be sized such that the plate portions do not overlap until the silent chain is bent. Alternatively, the plate portion of the protruding-portion-installed plate may be sized to avoid overlapping of the plate portions regardless of whether the silent chain is linearly extended or bent.

The number of plate longitudinal-direction trains arranged in the chain width direction is not limited and may be three or more.

What is claimed is:

1. A silent chain including a plurality of link plates arranged in a chain longitudinal direction and a chain width direction and coupled together by coupling pins so as to be bendable, the silent chain comprising:
   a plurality of plate longitudinal-direction trains each having the link plates arranged in the chain longitudinal direction, wherein
   at least one of the plurality of plate longitudinal-direction trains includes a plurality of protruding-portion-installed plates having protruding portions protruding in the chain width direction from one side surface of a plate portion, and
   the plurality of protruding-portion-installed plates are arranged adjacently to one another in the chain longitudinal direction, with the protruding portions being different from one another in orientation in the chain width direction.

2. The silent chain according to claim 1, wherein
   the protruding-portion-installed plate has a longitudinal pair of pin holes formed in juxtaposition in the chain longitudinal direction, and
   the protruding portion is a cylindrical protruding portion protruding in the chain width direction from an edge of the pin hole.

3. The silent chain according to claim 2, wherein
   the pin hole and the protruding portion of the protruding-portion-installed plate are formed by burring.

4. The silent chain according to claim 1, wherein a protrusion dimension of the protruding portion in the chain width direction is set equal to or larger than a thickness of the plate portion in the chain width direction.

5. The silent chain according to claim 1, wherein the plate portion is sized to allow the plate portions of the protruding-portion-installed plates adjacent to one another in the chain longitudinal direction to overlap as viewed in the chain width direction.

* * * * *